(12) United States Patent
Kajihara et al.

(10) Patent No.: US 11,059,207 B2
(45) Date of Patent: Jul. 13, 2021

(54) PRODUCTION METHOD FOR COMPOSITE MEMBER

(71) Applicants: The University of Tokyo, Tokyo (JP); The Foundation for the Promotion of Industrial Science, Tokyo (JP)

(72) Inventors: Yusuke Kajihara, Tokyo (JP); Fuminobu Kimura, Tokyo (JP); Yuta Tamura, Tokyo (JP); Naotake Nakura, Aichi (JP); Eiji Yamaguchi, Toyokawa (JP); Norihito Shibuya, Aichi (JP)

(73) Assignees: The University of Tokyo, Tokyo (JP); The Foundation for the Promotion of Industrial Science, Tokyo (JP)

( * ) Notice: Subject to any disclaimer, the term of this patent is extended or adjusted under 35 U.S.C. 154(b) by 179 days.

(21) Appl. No.: 16/075,777

(22) PCT Filed: Feb. 17, 2016

(86) PCT No.: PCT/JP2016/054602
§ 371 (c)(1),
(2) Date: Aug. 6, 2018

(87) PCT Pub. No.: WO2017/141381
PCT Pub. Date: Aug. 24, 2017

(65) Prior Publication Data
US 2019/0054672 A1    Feb. 21, 2019

(51) Int. Cl.
*B29C 45/14*    (2006.01)
*B32B 37/15*    (2006.01)
(Continued)

(52) U.S. Cl.
CPC .......... *B29C 45/14311* (2013.01); *B32B 3/06* (2013.01); *B32B 37/153* (2013.01);
(Continued)

(58) Field of Classification Search
None
See application file for complete search history.

(56) References Cited

U.S. PATENT DOCUMENTS 3,947,953 A * 4/1976 Okada .................... H01L 21/50
  29/827
4,036,668 A * 7/1977 Brandon ................... C08J 5/12
  148/276

(Continued)

FOREIGN PATENT DOCUMENTS

CN    101903170 A    12/2010
CN    103878925 A     6/2014
(Continued)

OTHER PUBLICATIONS

English language translation of JP 2001/225346 (Year: 2001).*

(Continued)

*Primary Examiner* — Edmund H Lee
(74) *Attorney, Agent, or Firm* — Faegre Drinker Biddle & Reath LLP

(57) ABSTRACT

Provided is a method for producing a composite member formed by bonding a base material and a resin member. The method includes: a surface treatment step of forming micro-order or nano-order asperities on a surface of a base material; and a bonding step of directly bonding, by injection molding, a resin member to the surface of the base material that has the asperities formed in the surface treatment step. In addition, the composite member includes: a base material having micro-order or nano-order asperities on a surface thereof; and a resin member that is in direct contact with the surface of the base material.

12 Claims, 11 Drawing Sheets

(51) Int. Cl.
  *B32B 3/06* (2006.01)
  *B32B 38/00* (2006.01)
  *B29K 67/00* (2006.01)
  *B29K 679/00* (2006.01)
  *B29K 705/02* (2006.01)

(52) U.S. Cl.
  CPC ............. *B29C 2045/14803* (2013.01); *B29C 2045/14868* (2013.01); *B29K 2067/006* (2013.01); *B29K 2679/08* (2013.01); *B29K 2705/02* (2013.01); *B32B 2038/002* (2013.01)

(56) References Cited

U.S. PATENT DOCUMENTS

| | | | | |
|---|---|---|---|---|
| 5,213,739 A | * | 5/1993 | Dickerson | ......... B29C 45/14311 156/245 |
| 2012/0043689 A1 | * | 2/2012 | Chang | ............... B29C 45/14311 264/154 |
| 2015/0064409 A1 | * | 3/2015 | Takeuchi | ................ B29C 70/86 428/164 |

FOREIGN PATENT DOCUMENTS

| | | | |
|---|---|---|---|
| CN | 104736337 A | | 6/2015 |
| DE | 102005013719 | * | 9/2006 |
| EP | 2832526 A1 | | 2/2015 |
| JP | 2001-225346 A | | 8/2001 |
| JP | 2010-167475 A | | 8/2010 |
| JP | 2012-11676 A | | 1/2012 |
| JP | 2015-16682 A | | 1/2015 |
| WO | WO-2005/046957 A1 | | 5/2005 |

OTHER PUBLICATIONS

Machine english translation of JP2001225346 provided by google patents (Year: 2020).*
International Preliminary Report on Patentability dated Aug. 30, 2018 for PCT/JP2016/054602.
Quan Yongxin, "Engineering Tribology", Zhejiang University Press, Nov. 30, 1994, including Partial English-language translation.

* cited by examiner

PRODUCTION METHOD FOR COMPOSITE MEMBER

TECHNICAL FIELD

An aspect and embodiment of the present invention relate to a method for producing a composite member, and a composite member.

BACKGROUND ART

A method for producing a composite member is disclosed in Patent Document 1. In this method, a resin member is directly bonded to a metal member by insert molding, and thereby a composite molding member in which the metal member and the resin member are combined is produced. A bonding surface of the metal member is roughened by a physical treatment or a chemical treatment. Likewise, a method for producing a composite member is disclosed in Patent Document 2. A bonding surface of a metal member is roughened by laser beam machining. It is mentioned in Patent Documents 1 and 2 that the bonding surface of the metal member is roughened, and thereby a bonding strength between the metal member and the resin member is improved.

CITATION LIST

Patent Document

[Patent Document 1] Japanese Unexamined Patent Publication No. 2015-016682
[Patent Document 2] Japanese Unexamined Patent Publication No. 2010-167475

SUMMARY OF INVENTION

Technical Problem

However, Patent Document 1 and 2 do not disclose that the influence which a form of the bonding surface of the metal member has on the bonding strength. In this technical field, a method for producing a composite member having an excellent bonding strength and a composite member having an excellent bonding strength are desired.

Solution to Problem

A method for producing a composite member according to an aspect of the present invention is a method for producing a composite member formed by bonding a base material and a resin member, and includes: a surface treatment step of forming micro-order or nano-order asperities on a surface of the base material; and a bonding step of directly bonding, by injection molding, a resin member to the surface of the base material that has the asperities formed in the surface treatment step.

In this method, the micro-order or nano-order asperities are formed on the surface of the base material that is directly bonded with the resin member. The resin member penetrates the micro-order or nano-order asperities, and is cured in the asperities, and thereby a strong anchor effect occurs compared to milli-order asperities. For this reason, this method can produce the composite member having an excellent bonding strength.

An arithmetic average inclination of the surface of the base material on which the asperities are formed in the surface treatment step may be 0.17 to 0.50. The arithmetic average inclination is to divide a measurement curve at regular intervals in a transverse direction, find an absolute value of a slope (an angle) of a segment connecting end and start points of the measurement curve in each section, and average the absolute values of the sections. In addition, a root-mean-square inclination of the surface of the base material on which the asperities are foamed in the surface treatment step may be 0.27 to 0.60. The root-mean-square inclination is calculated by a root-mean-square of an inclination at all points of a defined region. The root-mean-square inclination is to divide a measurement curve at regular intervals in a transverse direction, find a mean of a square value of a slope (an angle) of a segment connecting end and start points of the measurement curve in each section, and is square roots of the mean values. In this way, a parameter indicating how steep the inclination is in a narrow space is controlled, and thereby the composite member having an excellent bonding strength can be produced.

The surface treatment step may be a step for forming the asperities using blast machining. In this case, in comparison with another surface treatment technique for bonding members, a surface structure of a bonding surface can be quantitatively controlled, and surface machining can be performed at a low cost over a short time.

An injection pressure in the blast machining may be 0.5 to 2.0 MPa. A particle size of blasting abrasives in the blast machining may be 30 to 300 μm. Optimal micro-order or nano-order asperities can be formed on the surface of the base material on conditions of this blast machining.

A material of the base material may be a metal, glass, ceramic, or a resin. The micro-order or nano-order asperities are formed on the surface of the base material, and thereby the composite member having an excellent bonding strength can be produced even when the material of the base material is any one of the metal, the glass, the ceramic, or the resin.

A composite member according to another aspect of the present invention includes: a base material having micro-order or nano-order asperities on a surface thereof; and a resin member configured to be in direct contact with the surface of the base material.

In this composite member, since the resin member is in direct contact with the micro-order or nano-order asperities of the surface of the base material, a strong anchor effect occurs in comparison with milli-order asperities. For this reason, this composite member has an excellent bonding strength.

An arithmetic average inclination of the surface of the base material may be 0.17 to 0.50. In addition, a root-mean-square inclination of the surface of the base material may be 0.27 to 0.60. Since the asperities in which a parameter indicating how steep the inclination is in a narrow space is controlled are formed, this composite member has an excellent bonding strength.

A material of the base material may be a metal, glass, ceramic, or a resin. Since the micro-order or nano-order asperities are formed on the surface of the base material, the composite member has an excellent bonding strength even when the material of the base material is any one of the metal, the glass, the ceramic, or the resin.

Advantageous Effects of Invention

As described above, according to an aspect and embodiment of the present invention, a method for producing a composite member having an excellent bonding strength and a composite member having an excellent bonding strength are provided.

DESCRIPTION OF EMBODIMENTS

Hereinafter, embodiments will be described with reference to the drawings. In the following description, identical or equivalent elements are given identical reference signs, and duplicate description thereof will be omitted. A "bonding strength" in the present embodiments will be described as a "shear strength."

[Composite Member]

Figure 1:
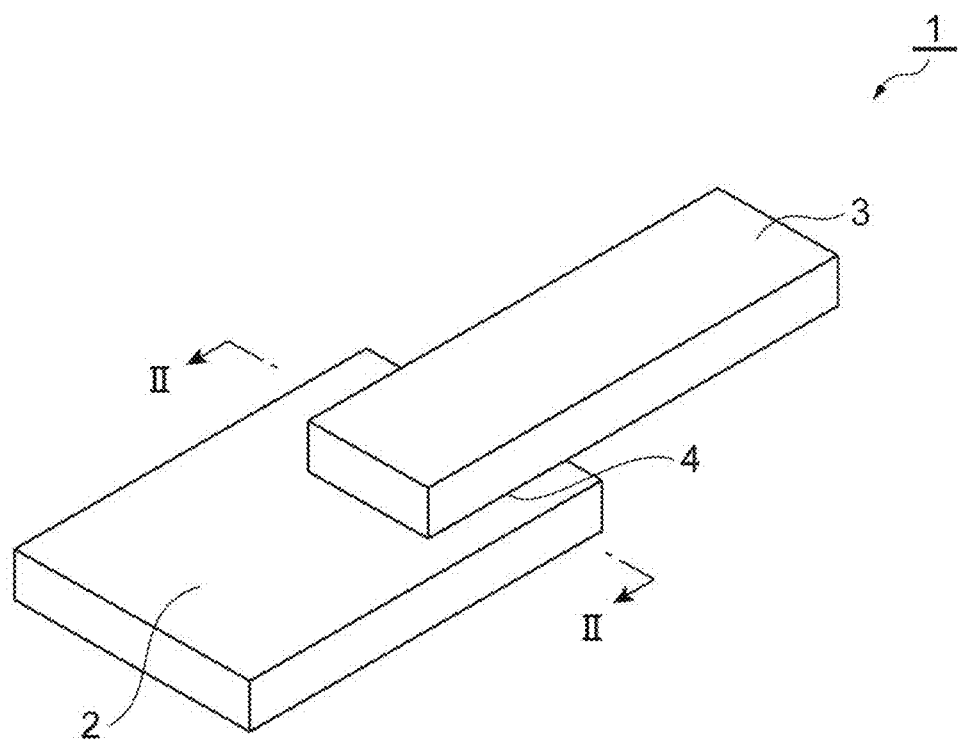
FIG. 1 is a perspective view illustrating a composite member according to an embodiment.

FIG. 1 is a perspective view illustrating a composite member 1 according to an embodiment. As illustrated in FIG. 1, the composite member 1 is a member in which a plurality of members are integrated by bonding. For example, the composite member 1 is a member formed by bonding a resin member to a member different from the resin member. The member different from the resin member is a member foamed of a material having a property such as a coefficient of thermal expansion, a coefficient of heat transfer, a strength, or the like that is different from that of the resin member.

The composite member 1 includes a base material 2 and a resin member 3. The base material 2 is a plate-like member as an example. The resin member 3 is in direct contact with a surface of the base material 2. In FIG. 1, the resin member 3 is in direct contact with a part of the surface of the base material 2 (a contact surface 4 of the base material 2), and has a lap joint structure. A material of the base material 2 is a metal, glass, ceramic, or a resin. A material of the resin member 3 is a resin such as polybutylene terephthalate, polyphenyl sulfide, polyamide, a liquid crystal polymer, polypropylene, acrylonitrile butadiene styrene, or the like.

Figure 2:
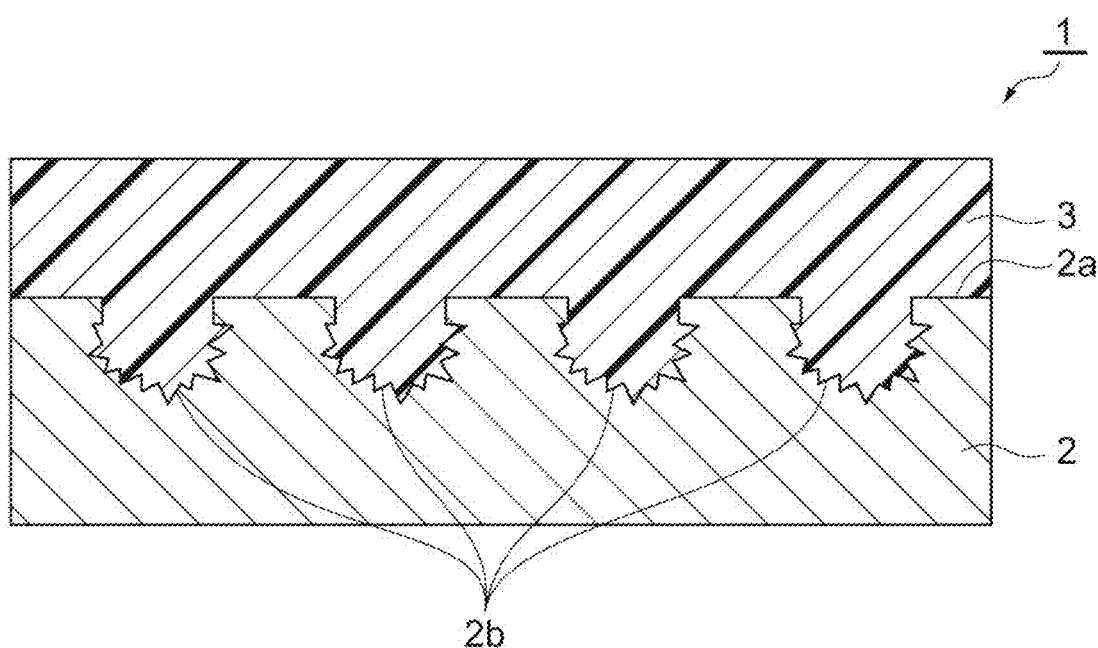
FIG. 2 is a sectional view of the composite member taken along line II-II of FIG. 1.

FIG. 2 is a sectional view of the composite member 1 taken along line II-II of FIG. 1. As illustrated in FIG. 2, the base material 2 has asperities 2b in a part (on the contact surface 4) of the surface 2a thereof. The asperities 2b are micro-order or nano-order asperities. Micro-order asperities are asperities that have a height difference of no less than 1 µm and less than 1000 µm. Nano-order asperities are asperities that have a height difference of no less than 1 nm and less than 1000 nm. As a more specific example, an arithmetic average roughness Ra, a maximum height Ry, and a ten-point average roughness Rz, which are prescribed by JIS B 0601 (1994), in a part (on the contact surface 4) of the surface 2a may be set to 0.2 to 5.0 µm, 1.0 to 30.0 µm, and 1.0 to 20.0 µm. If the arithmetic average roughness Ra, the maximum height Ry, and the ten-point average roughness Rz are within the above ranges, the asperities 2b exert a sufficient anchor effect on the resin member 3. Therefore, a bonding strength between the base material 2 and the resin member 3 is increased.

It is found that, when an arithmetic average inclination RΔa prescribed by JIS B 0601 (1994) is controlled, a higher bonding strength is obtained. As a specific example, the arithmetic average inclination RΔa may be set to 0.17 to 0.50. As the arithmetic average inclination RΔa becomes smaller, the bonding strength becomes lower. When the arithmetic average inclination RΔa is smaller than 0.17, it is difficult to obtain a practical bonding strength. As the arithmetic average inclination RΔa becomes greater, there is a need to control machining conditions for forming the asperities 2b to a greater extent. For this reason, when the arithmetic average inclination RΔa is greater than 0.50, productivity may be reduced. Especially, when these asperities 2b are formed by blast machining (to be described below), it is difficult to machine the asperities such that the arithmetic average inclination RΔa exceeds 0.50.

Further, it is found that, when a root-mean-square inclination RΔq is controlled in addition to the arithmetic average inclination RΔa, a higher bonding strength is obtained. As a specific example, the root-mean-square inclination RΔq may be set to 0.27 to 0.60. As the root-mean-square inclination RΔq becomes smaller, the bonding strength becomes lower. When the root-mean-square inclination RΔq is smaller than 0.27, it is difficult to obtain a practical bonding strength. As the root-mean-square inclination RΔq becomes greater, there is a need to control machining conditions for forming the asperities 2b to a greater extent. For this reason, when the root-mean-square inclination RΔq is greater than 0.60, productivity may be reduced. Especially, when these asperities 2b are formed by blast machining (to be described below), it is difficult to machine the asperities such that the root-mean-square inclination RΔq exceeds 0.60.

In a state in which a part of the resin member 3 penetrates into the asperities 2b, the resin member 3 is bonded to the base material 2. This structure is formed by injection molding using a metal mold 20 (to be described below).

In the composite member 1 according to the present embodiment, since the resin member 3 is in direct contact with the micro-order or nano-order asperities of the surface 2a of the base material 2, a strong anchor effect is produced compared to the case of the base material having milli-order asperities. For this reason, this composite member has an excellent bonding strength.

[Method for Producing Composite Member]

Figure 3:
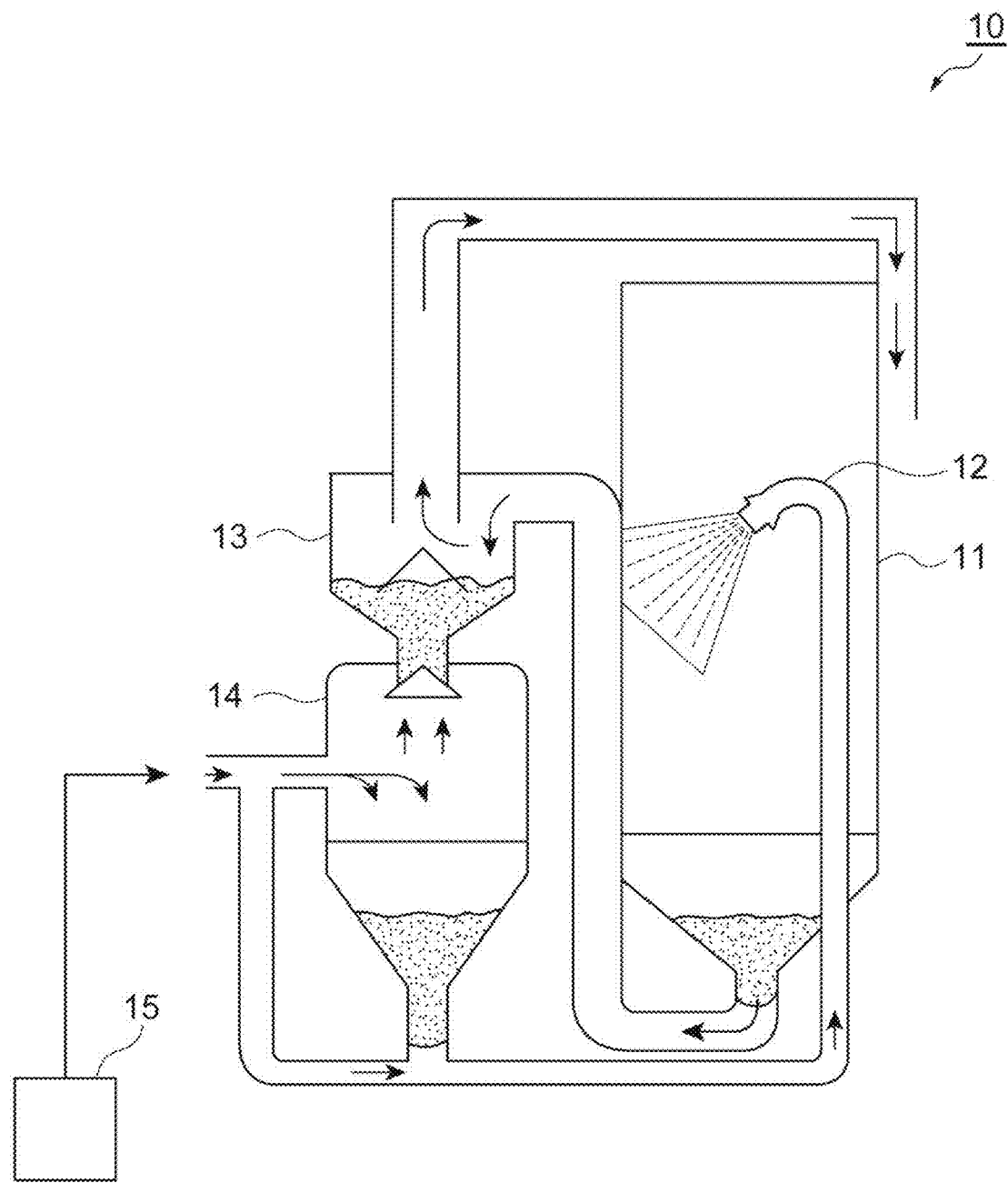
FIG. 3 is a conceptual diagram of a blast machining apparatus used in a method for producing a composite member according to an embodiment.

An outline of an apparatus used for the method for producing the composite member 1 will be described. First, an apparatus that performs blast machining on the surface of the base material 2 will be described. Any type of apparatus including a gravity type (suction type) air blast apparatus, a direct pressure type (pressurization type) air blast apparatus, a centrifugal blast apparatus, or the like may be used for the blast machining apparatus. The method according to the present embodiment uses a so-called direct pressure type (pressurization type) air blast apparatus as an example. FIG. 3 is a conceptual diagram of a blast machining apparatus 10 used in the method for producing the composite member 1. The blast machining apparatus 10 includes a processing chamber 11, a jet nozzle 12, a storage tank 13, a pressurizing chamber 14, a compressed gas feeder 15, and a dust collector (not shown).

The jet nozzle 12 is housed inside the processing chamber 11, and blast machining is performed on a workpiece (here, the base material 2) in the processing chamber 11. Blasting abrasives injected by the jet nozzle 12 falls down to a lower portion of the processing chamber 11 along with dust. The falling blasting abrasives are fed to the storage tank 13, and the dust is fed to the dust collector. The dust stored in the storage tank 13 is fed to the pressurizing chamber 14, and the pressurizing chamber 14 is pressurized by the compressed gas feeder 15. The blasting abrasives stored in the pressurizing chamber 14 are fed to the jet nozzle 12 along with a compressed gas. In this way, the workpiece is subjected to blast machining while circulating the blasting abrasives.

Figure 4:
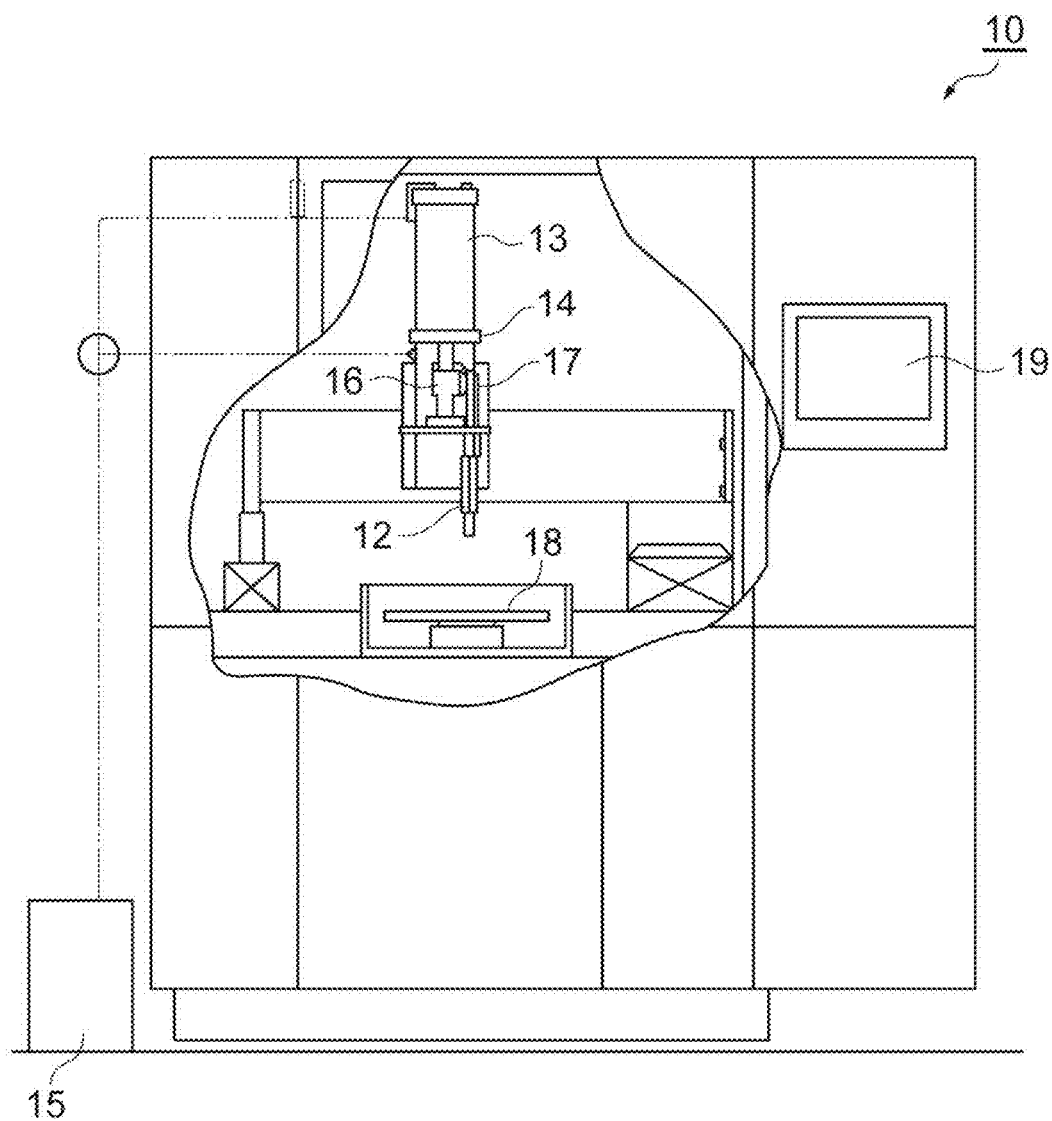
FIG. 4 is a view illustrating a configuration of the blast machining apparatus used in the method for producing a composite member according to the embodiment.

FIG. 4 is a view illustrating a configuration of the blast machining apparatus 10 used in the method for producing the composite member 1 according to the embodiment. The blast machining apparatus 10 illustrated in FIG. 4 is the direct pressure type blast apparatus illustrated in FIG. 3. In FIG. 4, a wall of the processing chamber 11 is illustrated with a part thereof removed.

As illustrated in FIG. 4, the blast machining apparatus 10 includes a storage tank 13 and a pressurizing chamber 14 for blasting abrasives which are connected to a compressed gas feeder 15 and are formed in a sealed structure, a fixed quantity feeder 16 that communicates with the storage tank 13 inside the pressurizing chamber 14, a jet nozzle 12 that communicates with the fixed quantity feeder 16 via a connecting pipe 17, a machining table 18 that is moved while holding a workpiece below the jet nozzle 12, and a controller 19.

The controller 19 controls the components of the blast machining apparatus 10. The controller 19 includes a display and a processing unit as an example. The processing unit is a general computer having a CPU, a storage, or the like. The controller 19 controls feed rates of the compressed gas feeder 15 that feeds a compressed gas to the storage tank 13 and the pressurizing chamber 14 on the basis of a set injection pressure and injection speed. The controller 19 controls an injection position of the jet nozzle 12 on the basis of a set distance between the workpiece and the nozzle and scanning conditions (a speed, a feed pitch, a scanning frequency, or the like) of the workpiece. As a specific example, the controller 19 controls a position of the jet nozzle 12 using a scanning speed (in an X direction) and a feed pitch (in a Y direction) that are set before a blast machining treatment. The controller 19 moves the machining table 18 holding the workpiece, and thereby controls the position of the jet nozzle 12.

Figure 5:
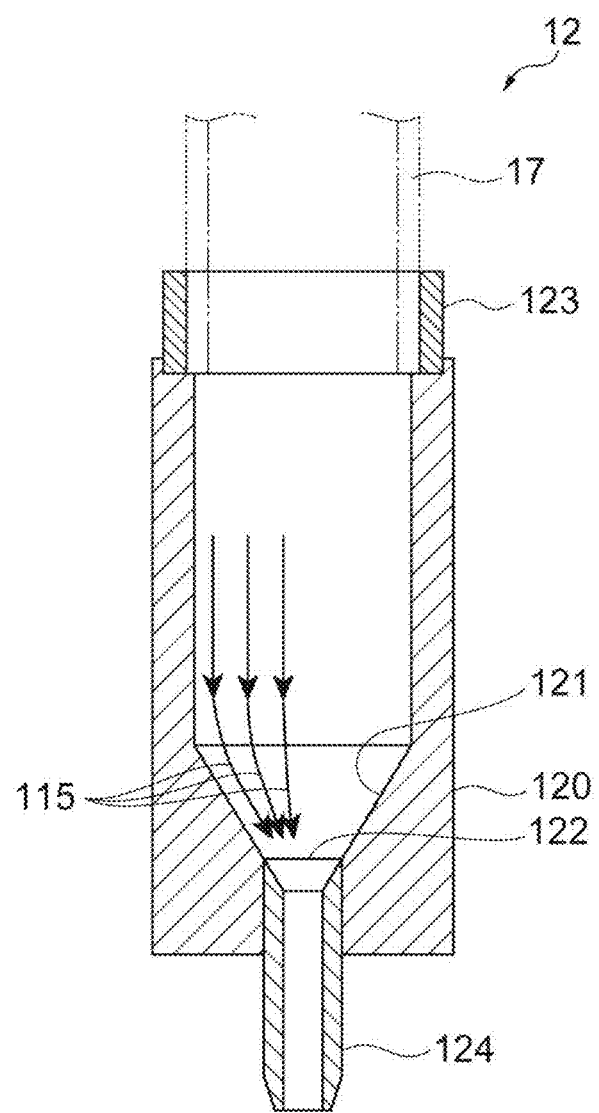
FIG. 5 is a sectional view of a jet nozzle of FIG. 4.

FIG. 5 is a sectional view of the jet nozzle 12 of FIG. 4. The jet nozzle 12 has an injection pipe holder 120 that is a body part. The injection pipe holder 120 is a tubular member in which a space through which the blasting abrasives and the compressed gas pass is formed. One end of the injection pipe holder 120 is blasting abrasives introduction port 123, and the other end of the injection pipe holder 120 is blasting abrasives discharge port 122. A conical convergence accelerating part 121 in which an inner wall surface tapered from the blasting abrasives introduction port 123 side toward the blasting abrasives discharge port 122 is formed and which has an inclined angle is formed inside the injection pipe holder 120. A cylindrical injection pipe 124 is provided at the blasting abrasives introduction port 123 side of the injection pipe holder 120 in a communicating way. The convergence accelerating part 121 tapers from the middle of a cylindrical portion of the injection pipe holder 120 toward the injection pipe 124. Thereby, compressed gas flows 115 are formed.

The connecting pipe 17 of the blast machining apparatus 10 is connected to the blasting abrasives introduction port 123 of the jet nozzle 12. Thereby, blasting abrasives path along which the storage tank 13, the fixed quantity feeder 16 inside the pressurizing chamber 14, the connecting pipe 17, and the jet nozzle 12 are connected in turn is formed.

In the blast machining apparatus 10 configured in the way, the compressed gas with a feed rate controlled by the controller 19 is fed from the compressed gas feeder 15 to the storage tank 13 and the pressurizing chamber 14. Due to a fixed flow pressure, the blasting abrasives inside the storage tank 13 are quantified by the fixed quantity feeder 16 inside the pressurizing chamber 14, are fed to the jet nozzle 12 via the connecting pipe 17, and are injected from the injection pipe of the jet nozzle 12 to a machining surface of the workpiece. Thereby, a certain amount of blasting abrasives is always injected to the machining surface of the workpiece. An injection position of the jet nozzle 12 with respect to the machining surface of the workpiece is controlled by the controller 19, and the workpiece is subjected to blast machining.

The injected blasting abrasives and powder cut by the blast machining are suctioned by the dust collector (not shown). A classifier (not shown) is disposed on a path that leads from the processing chamber 11 to the dust collector, and thereby reusable blasting abrasives and fine powder other than the reusable blasting abrasives (an blasting abrasives having a non-reusable size or the cut powder generated by the blast machining) are separated out. The reusable blasting abrasives are accommodated in the storage tank 13, and are again fed to the jet nozzle 12. The fine powder is collected by the dust collector.

Figure 6:
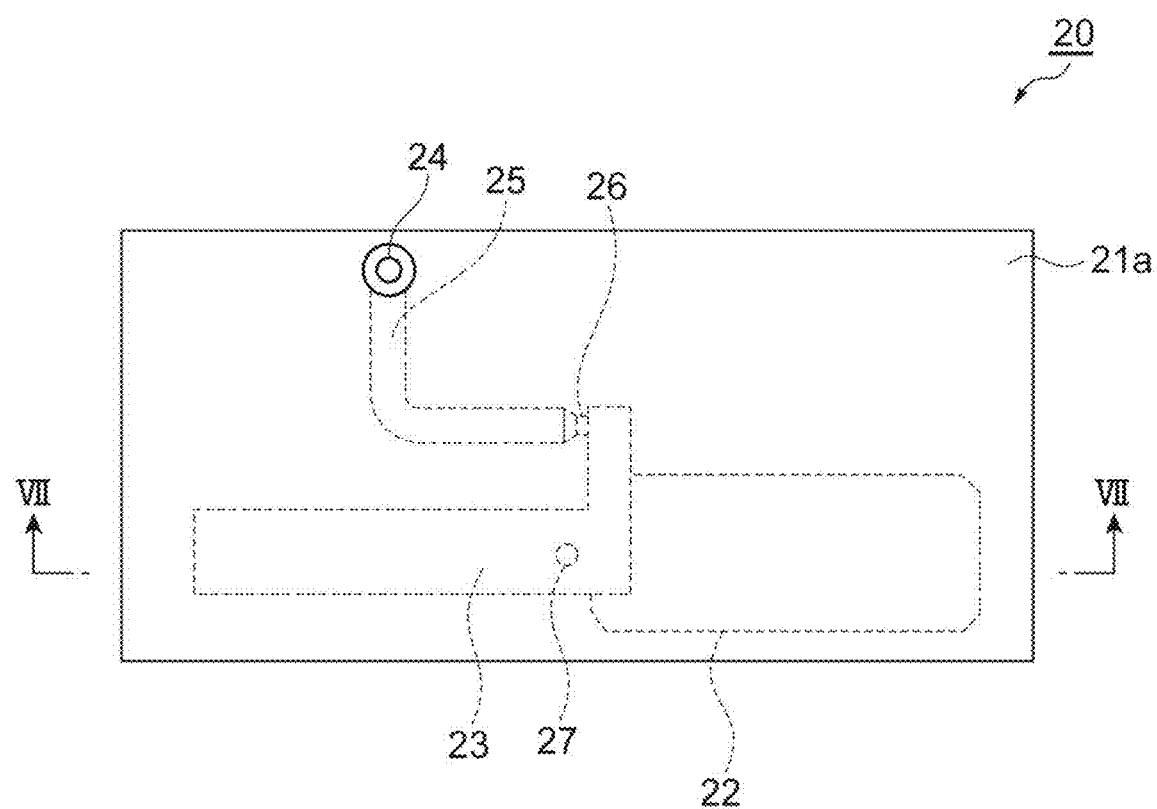
FIG. 6 is a top view of a metal mold used for injection molding.
Figure 7:
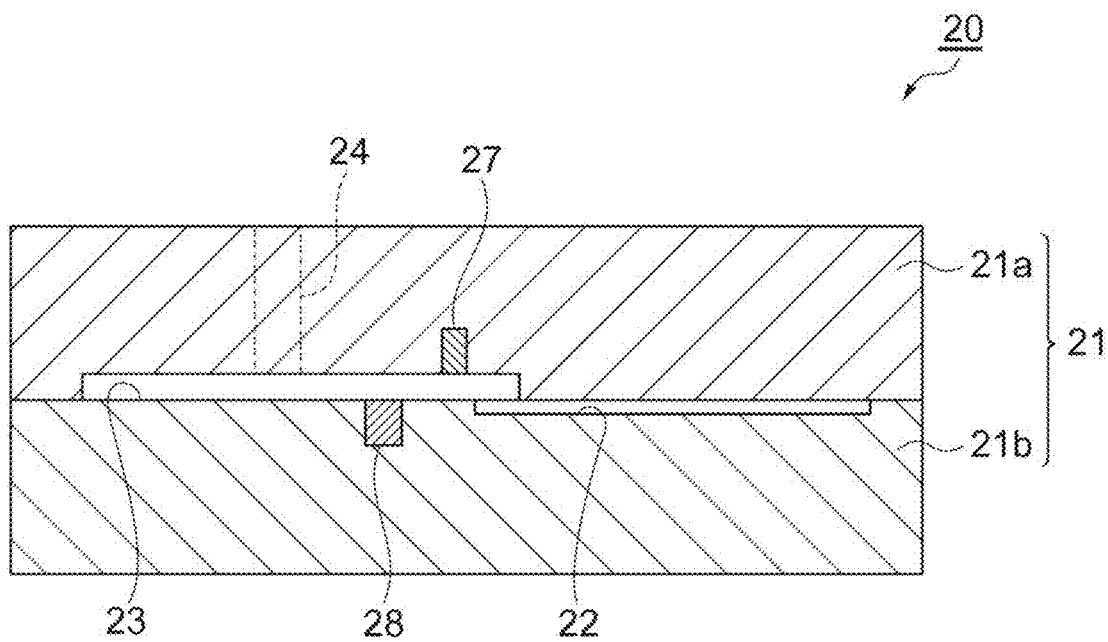
FIG. 7 is a sectional view of the metal mold taken along line VII-VII of FIG. 6.

Next, injection molding will be described. Insert molding is used here for the injection molding. In the insert molding, an insert is mounted in a predetermined metal mold, and a resin is injected, left and cured for a predetermined time. Afterward, residual stress in the resin is removed by heat treatment. FIG. 6 is a top view of the metal mold used for the injection molding. FIG. 7 is a sectional view of the metal mold taken along line VII-VII of FIG. 6. As illustrated in FIGS. 6 and 7, the metal mold 20 includes a metal mold main body 21 (an upper metal mold 21a and a lower metal mold 21b). A space 22 for mounting the insert (here, the base material 2) and a space 23 into which the resin is injected are provided between the upper metal mold 21a and the lower metal mold 21b. A resin injection port is provided on a top surface of the upper metal mold 21a. The resin injection port communicates with the space 23 via a sprue 24, a runner 25, and a gate 26. A pressure sensor 27 and a temperature sensor 28 are provided in the space 23, and detect a pressure and temperature of the space 23. Parameters of a molding machine (not shown) are adjusted on the basis of the detection results of the pressure sensor 27 and the temperature sensor 28, and a molding is produced. The parameters include a metal mold temperature, a resin temperature at the time of filling, a filling pressure, an injection rate, a retention time, a pressure at the time of retention, a heat treatment temperature, a heat treatment time, or the like. The molding molded by the metal mold 20 has a lap joint structure in which it is bonded in a predetermined area.

Figure 8:
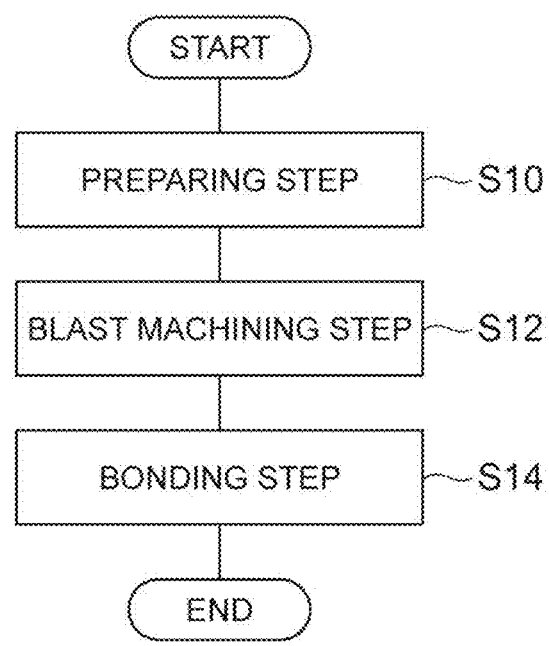
FIG. 8 is a flowchart of the method for producing a composite member according to the embodiment.

Next, a flow sequence of the method for producing the composite member 1 will be described. FIG. 8 is a flowchart of the method for producing the composite member 1 according to the embodiment. As illustrated in FIG. 8, first, in a preparing step (S10), a certain amount of blasting abrasives is filled into the blast machining apparatus 10. A particle size of the blasting abrasives is for instance 30 to 300 μm. As the particle size becomes smaller, a mass is reduced, and thus an inertial force is reduced. When the particle size is smaller than 30 μm, it is difficult to form the asperities 2b having a desired shape. As the particle size becomes larger, the mass is increased, and thus the inertial force is increased. For this reason, the blasting abrasives are thereby easily pulverized by collision with the base material 2. As a result, these problems occur: (1) since the energy of collision is dissipated except the formation of the asperities 2b, machining efficiency is poor, (2) wear of the blasting abrasives is severe and is not economical, or the like. These problems become conspicuous when the particle size exceeds 300 μm.

The controller 19 of the blast machining apparatus 10 acquires blast machining conditions as the preparing step (S10). The controller 19 acquires the blast machining conditions on the basis of an operation of an operator or information stored in the storage. The blast machining conditions include an injection pressure, an injection speed, a distance between the workpiece and the jet nozzle, scanning conditions (a speed, a feed pitch, a scanning frequency, or the like) of the workpiece, or the like. The injection pressure is for instance 0.5 to 2.0 MPa. As the injection pressure becomes lower, the inertial force is reduced. For this reason, when the injection pressure is lower than 0.5 MPa, it is difficult to form the asperities 2b having a desired shape. As the injection pressure becomes higher, the inertial force is increased. For this reason, the blasting abrasives are easily pulverized by collision with the base material 2. As a result, these problems occur: (1) since the energy of collision is dissipated except the formation of the asperities 2b, the machining efficiency is poor, (2) the wear of the blasting abrasives is severe and is not economical, or the like. These problems become conspicuous when the injection pressure exceeds 2.0 MPa. Since the controller 19 manages the blast machining conditions, sizes, depths, and a density of the asperities 2b of the surface 2a of the base material 2 are subject to accurate micro-order or nano-order control. The blast machining conditions may include conditions that specify a blast machining target region. In this case, a selective surface treatment is possible.

Figure 9:
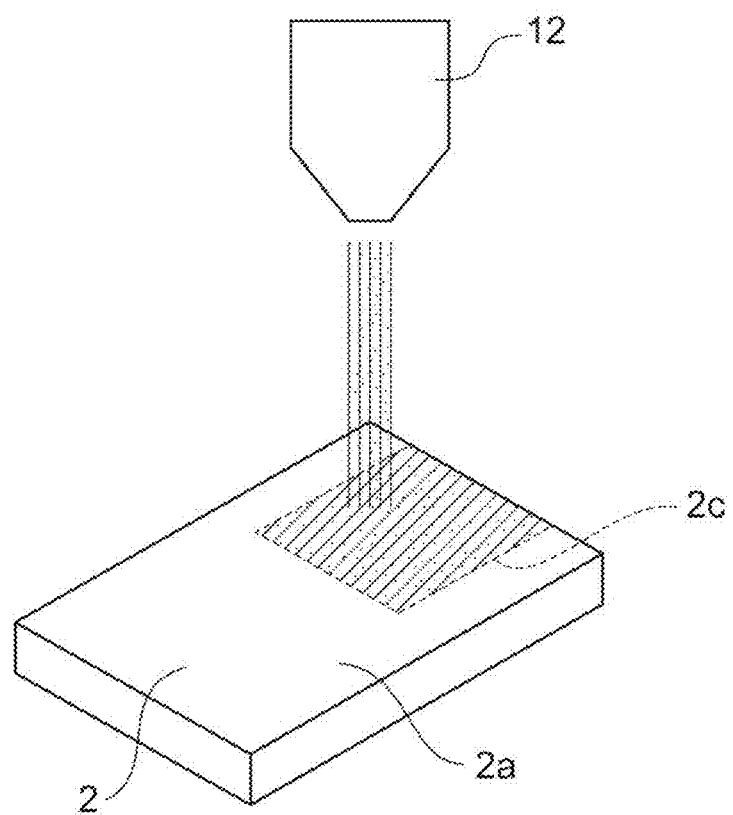
FIG. 9 is a conceptual diagram of blast machining.
Figure 10:
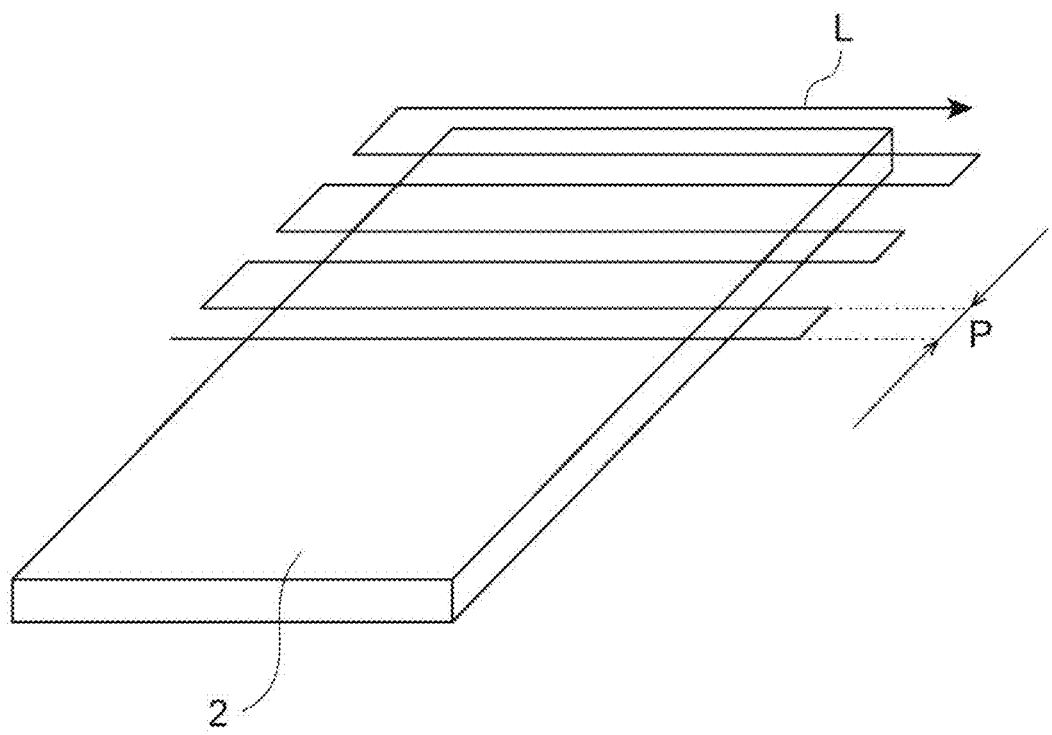
FIG. 10 is a view illustrating scanning of the blast machining.

Next, the blast machining apparatus 10 performs a series of steps as a blast machining step (S12: a surface treatment step). First, the base material 2 which is a target for blast machining is set on the machining table 18 inside the processing chamber 11. Next, the controller 19 actuates the dust collector (not shown). The dust collector reduces a pressure in the processing chamber 11 to bring about a negative pressure state on the basis of a control signal of the controller 19. Next, the jet nozzle 12 injects the blasting abrasives as a solid/gas two-phase flow at an injection pressure ranging from 0.5 to 2.0 MPa on the basis of a control signal of the controller 19. Subsequently, the controller 19 actuates the machining table 18 such that the base material 2 moves into an injection flow of the solid/gas two-phase flow (below the jet nozzle in FIG. 4). FIG. 9 is a conceptual diagram of the blast machining. As illustrated in FIG. 9, the blasting abrasives are injected from the jet nozzle 12 toward a partial region 2c of the surface 2a of the base material 2. Here, the controller 19 continues to actuate the machining table 18 such that the injection flow draws a preset locus with respect to the base material 2. FIG. 10 is a view illustrating scanning of the blast machining. As illustrated in FIG. 10, the controller 19 moves the machining table 18 along a locus L along which scanning is performed at a feed pitch P. Thereby, desired micro-order or nano-order asperities 2b are formed on the surface of the base material 2.

The blast machining is performed at an injection pressure ranging from 0.5 to 2.0 MPa using blasting abrasives having a particle size of 30 to 300 μm. The desired micro-order or nano-order asperities 2b (e.g., the asperities 2b in which the arithmetic average inclination RΔa and the root-mean-square inclination RΔq are controlled to be 0.17 to 0.50 and 0.27 to 0.60) are formed on the surface 2a of the base material 2. After the operation of the blast machining apparatus 10 is stopped, the base material 2 is ejected, and the blast machining is completed.

Next, the molding machine (not shown) performs molding using the aforementioned metal mold 20 as a bonding step (S14). First, the metal mold 20 is opened, the base material 2 subjected to the blast machining is mounted in the space 22, and the metal mold 20 is closed. The molding machine injects a melted resin, which has a set resin temperature, from the resin injection port to the inside of the metal mold 20. The injected resin is filled into the space 23 through the sprue 24, the runner 25, and the gate 26. The molding machine controls a filling pressure and an injection rate of the resin on the basis of the detection results of the pressure sensor 27. The molding machine controls a metal mold temperature such that it has a set value on the basis of the detection results of the temperature sensor 28. The molding machine controls a pressure such that it has a set value for a set retention time on the basis of the detection results of the pressure sensor 27. Afterward, the molding machine performs heat treatment on the basis of a set heat treatment temperature and time. Afterward, the molding machine opens the metal mold 20 and ejects the composite member 1 in which the base material 2 and the resin member 3 are integrated. When the bonding step (S14) is terminated, the flowchart illustrated in FIG. 8 is terminated.

As described above, in the method according to the present embodiment, the micro-order or nano-order asperities 2b are formed on the surface 2a of the base material 2 that is directly bonded to the resin member 3. The resin member 3 penetrates the micro-order or nano-order asperities 2b, and is cured in the asperities 2b, and a strong anchor effect occurs in comparison with milli-order asperities. For this reason, the method according to the present embodiment can produce the composite member 1 having an excellent bonding strength.

The micro-order or nano-order asperities 2b are formed on the surface 2a of the base material 2 by the blast machining. Thereby, in comparison with other surface treatment techniques for bonding members, a surface structure of the bonding surface can be quantitatively controlled, and surface machining can be performed at low cost over a short time.

For example, as other surface treatment techniques, chemical etching type and laser machining type treatments are known. The chemical etching type thereof is a technique in which a fine shape is formed on the surface of the metal member by chemical etching, and insert molding is performed, so that the metal member and the resin member are bonded. Since this technique is a wet process, although a treatment time is short because a batch process is possible, waste liquid disposal is required. In addition, in this technique, quantitative control of the fine shape is difficult. The laser machining type thereof is a technique in which a fine shape is formed on the surface of the metal member by laser machining, and insert molding is performed, so that the metal member and the resin member are bonded. This technique is a dry process, and there is concern that a cost of a laser light source may be high and a treatment time may be long, despite quantitative control of the fine shape being possible. In comparison with these techniques, the surface treatment technique based on blast machining allows quantitative control of the surface structure of the bonding surface, and realization of low cost and a short time therefor.

While the present embodiment has been described above, the present invention is not limited to the above embodiment, and in addition to the present embodiment can naturally be modified in various ways and be implemented without departing from the gist thereof.

[Modifications of the Base Material and the Resin Member]

The plate-like members are exemplified as the base material 2 and the resin member 3 according to the above embodiment. However, the plate-like member is not limited to a shape, and may adopt all shapes that can be in contact with each other. The resin member 3 according to the above embodiment is in contact with a part of the surface of the base material 2, but it may be in contact with the entire surface of the base material 2.

[Modification of the Injection Molding]

The injection molding is not limited to the insert molding, and may be an outsert molding.

EXAMPLES

[Base Material 2]
The base material 2 used the following materials.
Base material A: aluminum plate (Japanese Industrial Standards (JIS) A 5052)
Base material B: polyimide plate

[Blast Machining Step]
The surface of the base material 2 was subjected to blast machining using the blast machining apparatus 10 described in the above embodiment. The blasting abrasives used a mixture of blasting abrasives composed of aluminum oxide and blasting abrasives composed of glass. A particle size of the blasting abrasives was 40 to 250 μm. A blast area density (Coverage) that is a ratio of a total area occupied by dents of the blasting abrasives caused by the blast machining to a total area of a machined region was set to 50% to 100%, and the blast machining was performed by appropriately selecting the particle size of the blasting abrasives from a range of 40 to 250 μm and the injection pressure from a range of 0.5 to 2.0 MPa. The asperities 2b in which Ra, Ry, Rz, RΔa, and RΔq were controlled were formed on the surface of the base material 2.

[Bonding Step]
The resin member 3 was bonded to the base material 2 using the metal mold 20 described in the above embodiment. A material of the resin member 3 used a polybutylene terephthalate resin (PBT: Toray Industries, Inc., 1101G-X54). During filling, a metal mold temperature was set to 140° C., a resin temperature was set to 270° C., a filling pressure was set to 60 MPa, and an injection rate was set to 64.2 cm³/s. During retention, a retention pressure was set to 40 MPa, and a retention time was set to 8 s. During heat treatment, a heat treatment temperature was set to 130° C., and a heat treatment time was set to 2 h.

[Bonding Strength Evaluation]
A shear strength (shear stress) of the composite member 1 made on the above conditions was evaluated. An evaluation apparatus used an evaluation apparatus having a configuration in which deflection generated at the composite member 1 during measurement was inhibited to be able to more accurately measure a shear strength based on ISO 4587 (1995).

Figure 11:
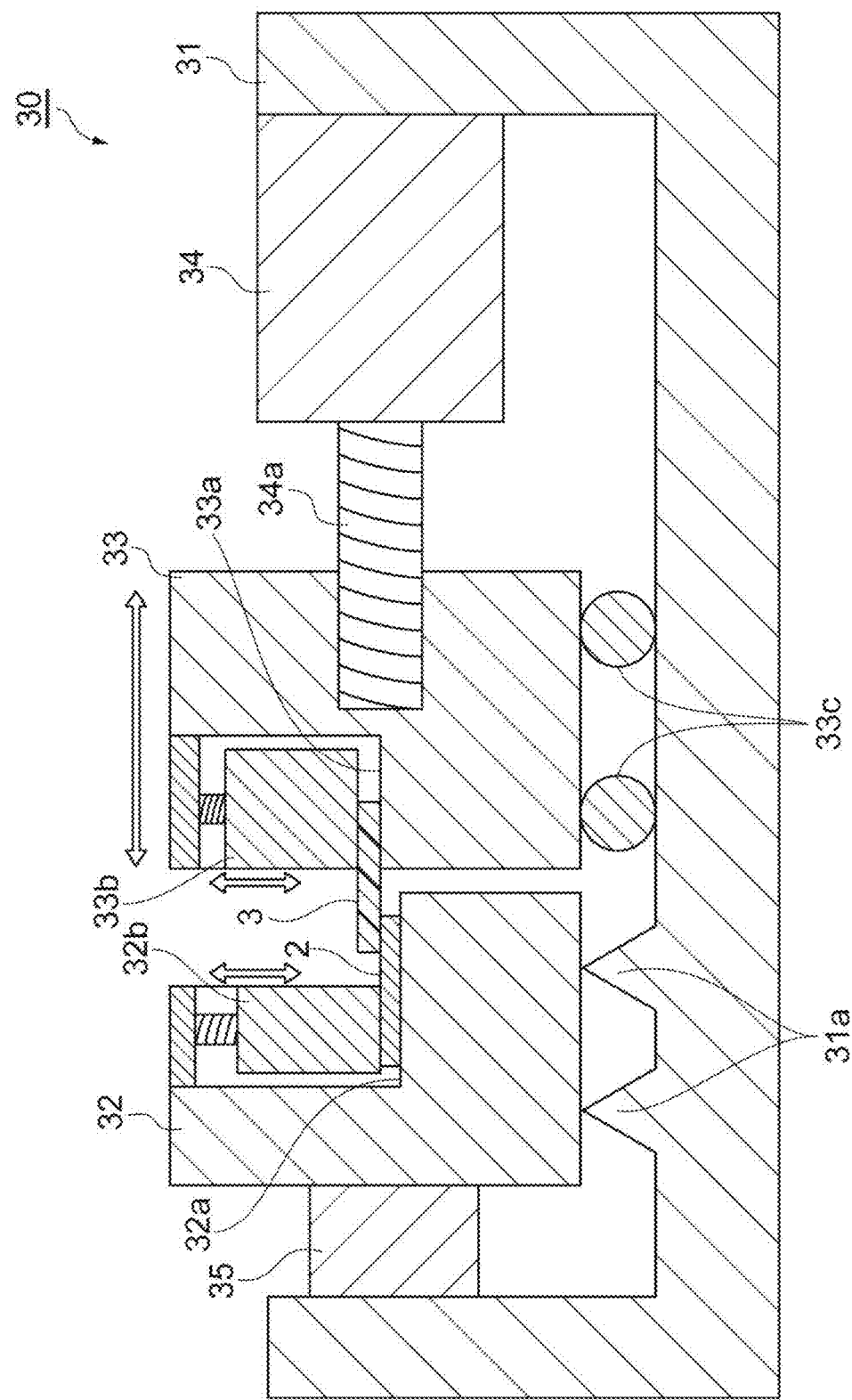
FIG. 11 is a schematic sectional view of an apparatus for evaluating shear stress

FIG. 11 is a schematic sectional view of an evaluation apparatus 30 of shear strength. As illustrated in FIG. 11, the evaluation apparatus 30 includes a base 31, a base material gripper 32 that grips the base material 2, and a resin member gripper 33 that grips the resin member 3. The base material gripper 32 and the resin member gripper 33 are disposed on the base 31 to face each other.

The base material gripper 32 grips the base material 2 between a gripping surface 32a and a pressing member 32b. A bottom of the base material gripper 32 is fixed to fixing parts 31a of the base 31.

The resin member gripper 33 grips the resin member 3 between a gripping surface 33a and a pressing member 33b. The resin member gripper 33 has wheels 33c on a bottom thereof, and is movable relative to the base material gripper 32 in a distal direction. The resin member gripper 33 is connected to a ball screw 34a of a motor 34 provided for the base 31, and movement relative to the base material gripper 32 in the distal direction is controlled. The motor 34 is actuated, and thereby a tensile force is applied between the base material 2 and the resin member 3. The tensile force is detected by a load cell 35 provided between the base 31 and the base material gripper 32.

In comparison with the gripping surface 32a of the base material gripper 32, the gripping surface 33a of the resin member gripper 33 is raised by a thickness of the base material 2. Thereby, an applying axis of the tensile force and a bonding surface between the base material 2 and the resin member 3 are consistent, and thus the shear force can be applied to the bonding surface. A size of the gripping surface 32a of the base material gripper 32 is larger than the base material 2. The entire base material 2 is supported by the gripping surface 32a. Thereby, the generation of the deflection is inhibited, and the state in which the applying axis of the tensile force and the bonding surface are consistent can be maintained. The measured results are shown in Table 1.

TABLE 1

| No. | Conditions | | | | | | Shear stress (MPa) |
| --- | --- | --- | --- | --- | --- | --- | --- |
| | Base material | Ra (μm) | Ry (μm) | Rz (μm) | RΔa | RΔq | |
| Example 1 | A | 0.895 | 7.975 | 4.904 | 0.156 | 0.252 | 6.4 |
| Example 2 | A | 1.205 | 8.254 | 6.001 | 0.173 | 0.279 | 7.2 |
| Example 3 | A | 2.116 | 14.384 | 9.333 | 0.205 | 0.333 | 18.5 |
| Example 4 | A | 2.113 | 13.274 | 9.032 | 0.208 | 0.336 | 13.7 |
| Example 5 | A | 2.241 | 14.365 | 10.015 | 0.209 | 0.331 | 16.5 |
| Example 6 | A | 2.084 | 14.554 | 9.328 | 0.209 | 0.361 | 9.5 |
| Example 7 | A | 1.979 | 12.158 | 8.776 | 0.216 | 0.349 | 14.7 |
| Example 8 | A | 2.509 | 16.067 | 9.554 | 0.217 | 0.373 | 8.5 |
| Example 9 | A | 2.320 | 16.394 | 10.243 | 0.222 | 0.339 | 18.5 |
| Example 10 | A | 2.681 | 16.500 | 10.995 | 0.223 | 0.362 | 9.5 |
| Example 11 | A | 2.276 | 17.294 | 10.207 | 0.226 | 0.404 | 12.4 |
| Example 12 | A | 2.437 | 16.194 | 10.270 | 0.227 | 0.360 | 18.0 |
| Example 13 | A | 2.632 | 18.629 | 11.084 | 0.227 | 0.370 | 16.2 |
| Example 14 | A | 2.981 | 19.232 | 11.586 | 0.232 | 0.395 | 9.0 |
| Example 15 | A | 2.110 | 14.758 | 10.100 | 0.236 | 0.385 | 11.7 |
| Example 16 | A | 2.104 | 17.834 | 10.731 | 0.246 | 0.406 | 8.7 |
| Example 17 | A | 2.726 | 19.179 | 11.776 | 0.250 | 0.457 | 14.2 |
| Example 18 | A | 1.680 | 12.087 | 8.765 | 0.267 | 0.415 | 19.7 |
| Example 19 | A | 1.719 | 11.619 | 8.640 | 0.275 | 0.410 | 19.0 |
| Example 20 | A | 1.741 | 11.958 | 8.974 | 0.277 | 0.423 | 20.5 |
| Example 21 | A | 1.597 | 11.754 | 8.307 | 0.283 | 0.420 | 19.5 |
| Example 22 | A | 1.706 | 14.022 | 9.249 | 0.291 | 0.436 | 21.0 |

TABLE 1-continued

| | | Conditions | | | | | Shear stress (MPa) |
|---|---|---|---|---|---|---|---|
| No. | Base material | Ra (μm) | Ry (μm) | Rz (μm) | RΔa | RΔq | |
| Example 23 | A | 2.511 | 16.374 | 11.254 | 0.497 | 0.520 | 25.3 |
| Example 24 | A | 2.954 | 19.302 | 10.243 | 0.294 | 0.399 | 7.7 |

Example 1 was an example in which Ra, Ry, and Rz were controlled to be a range of 0.2 to 5.0 μm, a range of 1.0 to 30.0 μm, and a range of 1.0 to 20.0 μm using the base material A, and a shear stress was 6.4 MPa. It was suggested that this shear stress fell slightly below practical shear stress (estimated to be 7 MPa) but the parameters of the asperities 2b were more accurately controlled, and thereby the practical shear stress could be obtained.

Examples 2 to 23 were examples in which RΔa and RΔq were controlled to be a range of 0.17 to 0.50 and a range of 0.20 to 0.60 using the base material A. It was confirmed that all the examples sharply exceeded the practical shear stress and the resin was excellently bonded.

Example 24 was an example in which RΔa and RΔq were controlled to be a range of 0.17 to 0.50 and a range of 0.20 to 0.60 using the base material B, an example of a case in which a material other than a metal was used as the base material. It was confirmed that all the examples sharply exceeded the practical shear stress and the resin was excellently bonded even when the base material was the material other than the metal.

INDUSTRIAL APPLICABILITY

It is found that the composite member having an excellent bonding strength can be produced by forming the micro-order or nano-order asperities on the surface of the base material. These asperities can also be formed by blast machining. The bonding technology using the blast machining uniquely satisfies most important three requirements (quantitative control of the surface structure, a treatment time and treatment costs, a dry process) required for surface treatment type different material direct bonding. Since the blast machining can easily form these asperities, it is advantageous from the viewpoint of an environment and an economy. For this reason, it can be greatly expected that the bonding technology using the blast machining greatly develops direct bonding technology to prompt the development of industry.

REFERENCE SIGNS LIST

1 . . . Composite member, 2 . . . Base material, 3 . . . Resin member, 10 . . . Blast machining apparatus, 11 . . . Processing chamber, 12 . . . Jet nozzle, 13 . . . Storage tank, 14 . . . Pressurizing chamber, 15 . . . Compressed gas feeder, 16 . . . Fixed quantity feeder, 17 . . . Connecting pipe, 18 . . . Machining table, 19 . . . Controller, 20 . . . Metal mold, 21 . . . Metal mold main body

The invention claimed is:

1. A method for producing a composite member formed by bonding a base material and a resin member, the method comprising:
   a surface treatment step of forming micro-order or nano-order asperities on a surface of the base material; and
   a bonding step of directly bonding, by injection molding, a resin member to the surface of the base material that has the asperities formed in the surface treatment step,
   wherein an arithmetic average inclination of the surface of the base material that has the asperities formed in the surface treatment step is 0.17 to 0.50.

2. The method according to claim 1, wherein a root-mean-square inclination of the surface of the base material that has the asperities formed in the surface treatment step is 0.27 to 0.60.

3. The method according to claim 2, wherein a material of the base material is a metal, glass, ceramic, or a resin.

4. The method according to claim 2, wherein the surface treatment step is a step of forming the asperities using blast machining.

5. The method according to claim 1, wherein the surface treatment step is a step of forming the asperities using blast machining.

6. The method according to claim 5, wherein an injection pressure in the blast machining is 0.5 to 2.0 MPa.

7. The method according to claim 6, wherein a particle size of blasting abrasives in the blast machining is 30 to 300 μm.

8. The method according to claim 6, wherein a material of the base material is a metal, glass, ceramic, or a resin.

9. The method according to claim 5, wherein a particle size of blasting abrasives in the blast machining is 30 to 300 μm.

10. The method according to claim 9, wherein a material of the base material is a metal, glass, ceramic, or a resin.

11. The method according to claim 5, wherein a material of the base material is a metal, glass, ceramic, or a resin.

12. The method according to claim 1, wherein a material of the base material is a metal, glass, ceramic, or a resin.

* * * * *